United States Patent [19]
Heismann et al.

[11] Patent Number: 5,359,678
[45] Date of Patent: Oct. 25, 1994

[54] APPARATUS AND METHOD EMPLOYING FAST POLARIZATION MODULATION TO REDUCE EFFECTS OF POLARIZATION HOLE BURNING AND/OR POLARIZATION DEPENDENT LOSS

[75] Inventors: Fred L. Heismann, Freehold; Robert L. Rosenberg, Fair Haven, both of N.J.

[73] Assignee: AT&T Bell Laboratories, Murray Hill, N.J.

[21] Appl. No.: 79,437

[22] Filed: Jun. 18, 1993

[51] Int. Cl.$^5$ .................. G02B 6/10; G02F 1/035
[52] U.S. Cl. ............................. 385/1; 385/2
[58] Field of Search ........................ 385/1–4, 385/8, 9

[56] References Cited

U.S. PATENT DOCUMENTS

| 4,901,728 | 2/1990 | Hutchison | 128/633 |
| 5,009,230 | 4/1991 | Hutchinson | 128/633 |
| 5,212,743 | 5/1993 | Heismann | 385/11 |
| 5,247,382 | 9/1993 | Suzuki | 359/156 |
| 5,253,309 | 10/1993 | Nazarathy et al. | 385/4 |

OTHER PUBLICATIONS

IEEE Journal of Quantum Electronics, vol. QE-19, No. 11, pp. 1704–1717, Nov., 1983, "Spectral and Polarization Hole Burning in Neodymium Glass Lasers" by Douglas W. Hall, et al.
Journal of Lightwave Technology, vol. 6, No. 6, (ISSN 0733-8724), pp. 838–845, Jun., 1990, "Analysis of Input-Polarization-Induced Phase Noise in Interferometric Fiber-Optic Sensors and Its Reduction using Polarization Scrambling" by Alan D. Kersey, et al.
Journal of Lightwave Technology, vol. 6, No. 10, (ISSN 0733-8724), pp. 1599–1609, Oct., 1988, "Optimization and Stabilization of Visibility in Interferometric Fiber-Optic Sensors Using Input-Polarization Control" by A. D. Kersey, et al.
Electronics Letters, vol. 23, No. 12, pp. 634–636, Jun. 4, 1987, "Monomode Fibre Polarisation Scrambler" by A. D. Kersey, et al.
Electronics Letters, vol. 23, No. 10, pp. 513–514, May 7, 1987, "Polarisation-Insensitive Heterodyne Detection Using Polarisation Scrambling" by T. G. Hodgkinson, et al.
Electronics Letters, vol. 24, No. 15, pp. 931–933, Jul. 21, 1988 "Input-Polarisation Scanning Technique for Overcoming Polarisation-Induced Signal Fading in Interferometric Fibre Sensors" by A. D. Kersey, et al.
Optics Letters, vol. 16, No. 6, Mar. 15, 1991, pp. 381–383, "Depolarized source for fiber-optic applications" W. K. Burns, et al.
Proceedings of the SPIE—The International Society for Optical Engineering, vol. 838, pp. 360–364, 1987 (month not available), "Single-Mode Fiber Pseudo-Depolarizer" by A. D. Kersey, et al.
Conference on Optical Fiber Communication/International Conference on Integrated Optics and Optical Fiber Communication, OFC '93/IOOC '93, San Jose, Calif., Feb. 21–26, 1993, Post-Deadline Paper (PD5-1), "Observation of new polarisation dependence effect in long haul optically amplified system" by M. G. Taylor.

Primary Examiner—Frank Gonzalez
Attorney, Agent, or Firm—Thomas Stafford

[57] ABSTRACT

The effects of polarization dependent hole burning and/or polarization dependent loss are reduced by modulating the state of polarization (SOP) of an optical signal being launched into the transmission path periodically between first and second states of polarization of at least one pair of orthogonal states of polarization. Ideally, the launched modulated signal should spend equal time intervals in both states of the orthogonal pair. In one exemplary embodiment, the SOP is modulated such that it moves along a great circle on the Poincaré sphere. In another exemplary embodiment, the SOP is modulated such that it traces a complete great circle on the Poincaré sphere. In a preferred embodiment, a complete great circle is traced at a uniform speed on the Poincaré sphere.

24 Claims, 3 Drawing Sheets

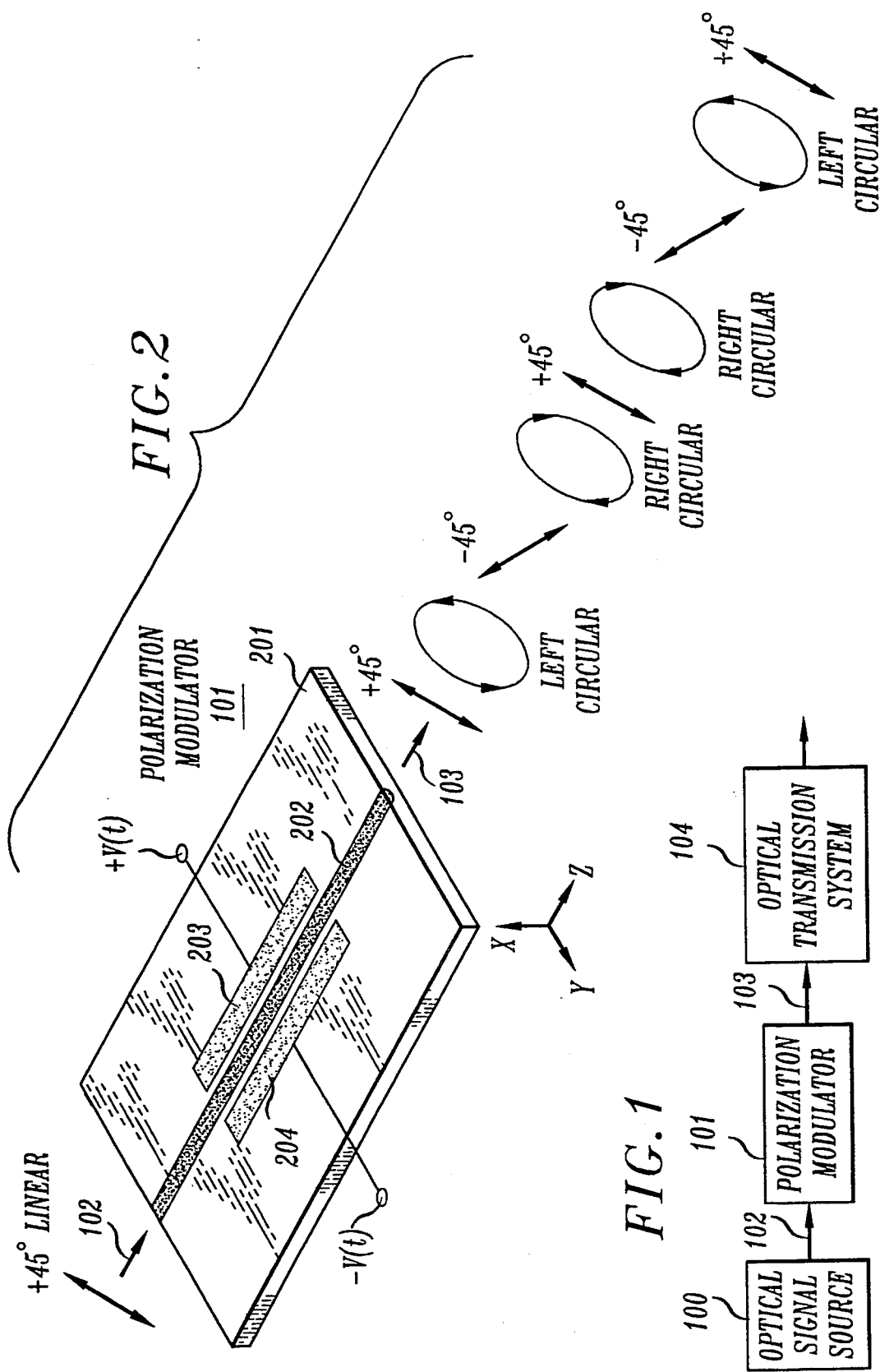

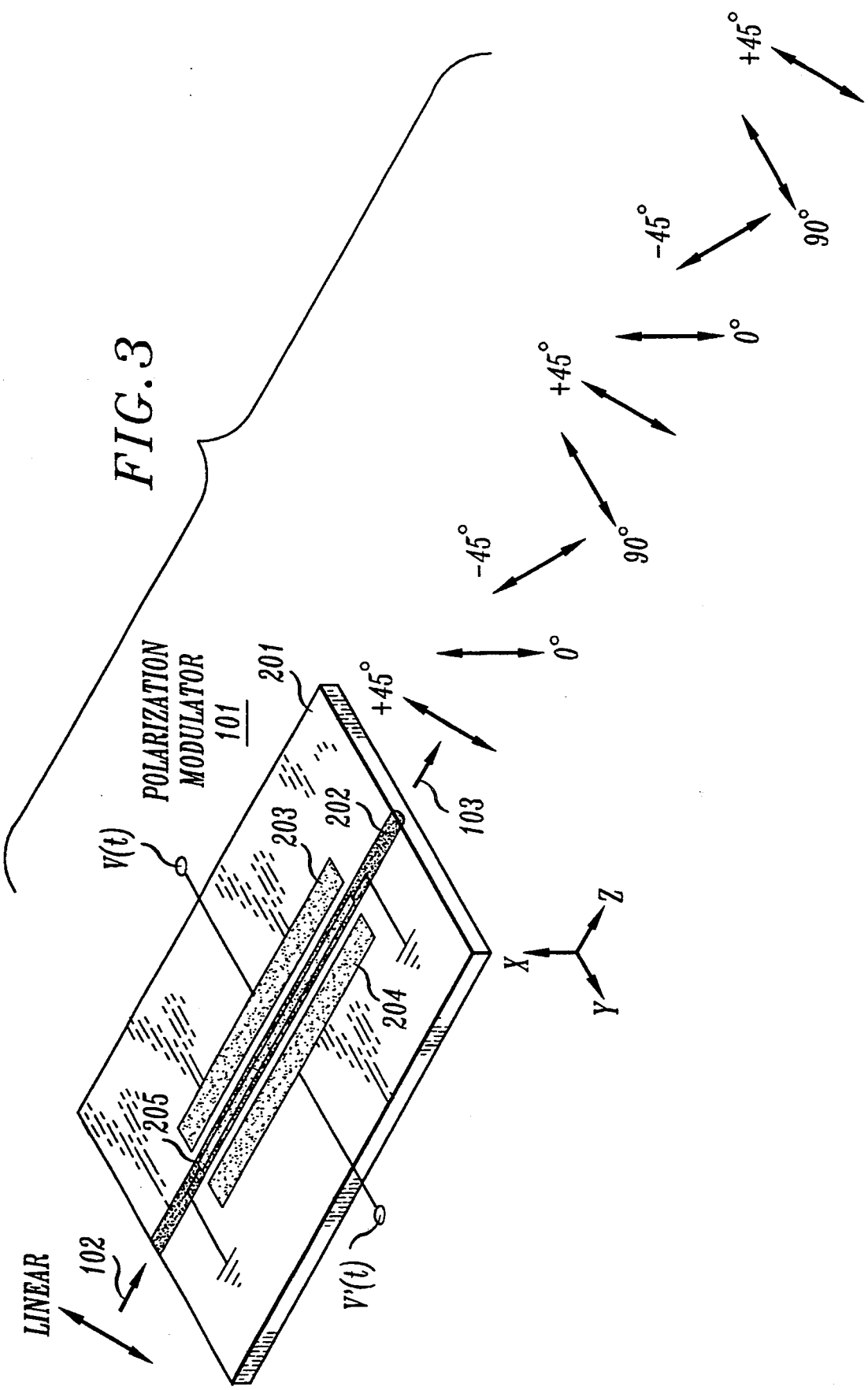

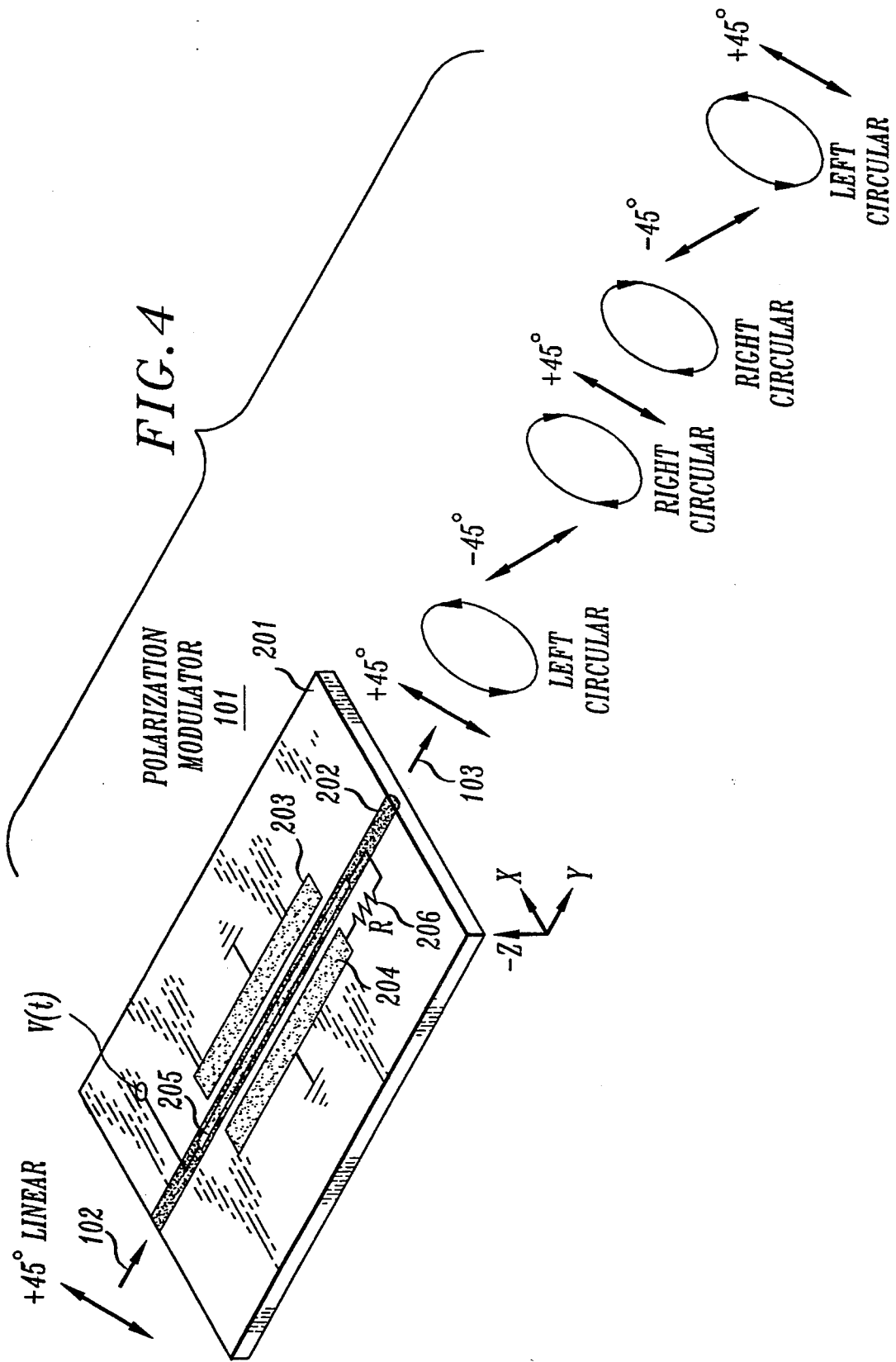

APPARATUS AND METHOD EMPLOYING FAST POLARIZATION MODULATION TO REDUCE EFFECTS OF POLARIZATION HOLE BURNING AND/OR POLARIZATION DEPENDENT LOSS

CROSS-REFERENCE TO RELATED APPLICATION

U.S. patent application Ser. No. 08/079432 was filed concurrently herewith and is now allowed.

TECHNICAL FIELD

This invention relates to the optical transmission of information and, more particularly, to improving transmission capabilities over long-distance optical transmission paths employing repeaters.

BACKGROUND OF THE INVENTION

Very long optical fiber transmission paths, such as those employed in undersea or trans-continental terrestrial lightwave transmission systems including optical-amplifier repeaters, are subject to decreased performance caused by a host of possible impairments. The impairments typically increase as a function of the length of the optical transmission. In long optical transmission paths that include optical amplifiers, the impairments tend to vary with time and cause a random fluctuation in the signal-to-noise ratio (SNR) of the optical transmission path. The random fluctuation in SNR contributes to a phenomenon known as signal fading. The SNR fluctuations also result in an increased average bit error ratio (BER) in digital signals being transmitted over the optical transmission path. When the SNR of a digital signal being transported on such an optical transmission path becomes unacceptably small relative to the average SNR (resulting in an undesirably high BER), a signal-to-noise fade is said to have occurred. Experimental evidence has shown that the signal fading and SNR fluctuations are caused by a number of polarization dependent effects induced by the optical fiber itself and/or other optical components within the transmission path. In particular, one of these effects has now been identified as polarization dependent hole burning (PDHB), which is related to the population inversion dynamics of the optical amplifiers. A discussion of hole-burning can be found in an article by D. W. Douglas, R. A. Haas, W. F. Krupke and M. J. Weber, entitled "Spectral and Polarization Hole Burning in Neodymium Glass Lasers"; *IEEE Journal of Quantum Electronics*, Vol. QE-19, No. 11, November 1983.

PDHB reduces gain of the optical amplifiers within the long optical transmission path for any signal having a state of polarization ("SOP") parallel to that of a polarized primary optical signal carded by the transmission path. However, the gain provided by these amplifiers for optical signals which have an SOP orthogonal to that of the primary signal remains relatively unaffected. In simplified terms, the primary optical signal produces an anisotropic saturation of the amplifier that is dependent upon the SOP of the primary optical signal. The polarized primary signal reduces the level of population inversion anisotropically within the amplifier, and results in a lower gain for optical signals in that SOP. This effectively causes the amplifier to preferentially enhance noise having an SOP orthogonal to that of the primary signal. This enhanced noise lowers the SNR of the transmitted information and causes an increased BER.

A prior method for reducing signal fading employs a two-wavelength light source to transmit information in two orthogonial states of polarization over an optical fiber transmission path. Since this light source shares its optical power equally on any two orthogonal SOPs within the fiber, deleterious polarization-dependent effects may be reduced as long as the two wavelengths remain orthogonally polarized along the optical transmission path.

SUMMARY OF THE INVENTION

The problems relating to polarization dependent hole burning and/or polarization dependent loss are overcome, in accordance with the principles of the invention, by modulating the state of polarization (SOP) of an optical signal being launched into the transmission path periodically between first and second states of polarization of at least one pair of orthogonal states of polarization. Preferably, the the SOP modulation is at a rate that is substantially higher than $1/t_s$, where $t_s$ is the anisotropic saturation time of the optical amplifier. Ideally, the launched modulated signal should spend equal time intervals in both states of the orthogonal pair.

In one exemplary embodiment of the invention, the SOP is modulated such that it moves along a great circle on the Poincaré sphere. In another exemplary embodiment of the invention, the SOP is modulated such that it traces a complete great circle on the Poincaré sphere. In a preferred embodiment of the invention, a complete great circle is traced at a uniform speed on the Poincaré sphere.

Additionally, for applications in which it is desirable to reduce effects of polarization dependent loss, the SOP modulation frequency is selected to be a multiple of the information signal clock.

BRIEF DESCRIPTION OF THE DRAWING

In the drawing:

DETAILED DESCRIPTION

FIG. 1 shows a simplified block diagram of an exemplary arrangement facilitating the practice of the invention. As shown, the invention includes polarization modulator 101 which is employed to modulate the SOP of an optical information signal from optical signal source 100 to be supplied to optical transmission system 104. To this end, optical information signal 102 is launched into polarization modulator 101 and the resulting modulated optical information signal 103 is supplied to transmission system 104. Optical information signals such as 102 are produced by a laser transmitter (not shown) in optical signal source 100, in well-known fashion. Specifically, the polarization state of optical signal 102 being supplied to polarization modulator 101 is such as to assure adequate modulation through pairs of orthogonal polarization states.

FIG. 2 shows one embodiment of polarization modulator 101 which may be advantageously used in practicing the invention. An integrated optic realization of polarization modulator 101 is fabricated on low-birefringence X-cut, Z-propagating $LiNbO_3$ substrate 201 and operates with a standard titanium-indiffused, single mode waveguide 202. It includes two electrodes 203 and 204 disposed on substrate 201 on both sides of waveguide 202.

The embodiment of polarization modulator 101 shown in FIG. 2 operates to retard the polarization component of the incoming optical signal 102 parallel to the X axis (TM mode) relative to the polarization component of the incoming optical signal parallel to the Y axis (TE mode). The TE-TM mode phase shift is induced via the $r_{22}$ and $r_{12}$ ($r_{22} = -r_{12} = 3.4 \cdot 10^{-12}$ m/V) electro-optic coefficients by applying balanced drive voltage components V(t) and −V(t) to electrodes 203 and 204, thereby inducing an electric field $E_y$ in waveguide 202. total induced phase shift $\Phi(t)$ between the X and Y polarized components is $$\phi(t) = \Gamma (r_{12} - r_{22}) \frac{2\pi}{\lambda} \cdot \frac{V(t)}{G} \cdot L\, n_o^3 \tag{1}$$

where t is time, $\lambda$ is the flee-space wavelength, G is the gap between electrodes 203 and 204, L is the length of electrodes 203 and 204, $n_o$ is the ordinary index of refraction and $\Gamma$ is a normalized overlap parameter between the optical and electrical fields.

The optical information signal 102 is launched into waveguide 202 of polarization modulator 101 having equal components of polarization along the X and Y axes. Modulation of the drive voltages applied to two electrodes 203 and 204 then causes the output polarization state of the resulting modulated optical signal 103 to move along a polar great circle on the Poincaré sphere. If the drive voltages V(t) and −V(t) being applied to electrodes 203 and 204 are periodically modulated such that the peak-to-peak voltage amplitude induces a total phase shift $\Delta\Phi(t) = \pi$, then the SOP of output optical signal 103 is periodically modulated between two orthogonal polarization states. If the peak-to-peak voltage amplitude being applied to electrodes 203 and 204 is adjusted to induce a total phase shift of $\Delta\Phi(t) = 2\pi$, then the SOP of output optical signal 103 traces a full great circle on the Poincaré sphere. In a preferred embodiment of the invention, the drive voltages applied to electrodes 203 and 204 of polarization modulator 101 are symmetric sawtooth voltages of the form $$V(t) = V_\pi(-1)^n(4\,ft - 2\,n), \text{ for } 2n - 1 \leq 4\,ft \; 23\; 2\,n+1, \tag{2}$$

where t is time, n is an arbitrary integer, 1/f is the sawtooth period, and $V_\pi$ is the voltage for inducing a phase shift of $\Delta\Phi(t) = \pi$. Preferably, the rate of the SOP modulation is at a rate substantially higher than $1/t_s$, where $t_s$ is the anisotropic saturation time of the optical amplifier (typically 1 ms).

In the example shown in FIG. 2, polarization modulator 101 operates to modulate an incoming optical information signal 102 having a 45° linear SOP relative to the X and Y axes. In response to the symmetrical sawtooth drive voltages V(t) and −V(t), noted above, being applied to the modulator electrodes 203 and 204, respectively, the SOP of the optical signal 103 emerging as an output from modulator 101 traces a complete polar great circle on the Poincaré sphere and, then, returns in the opposite direction to the point of beginning, as shown in FIG. 2. Thus, in a steady state condition, the SOP of optical signal 103 proceeds through the sequence of polarization states shown, namely: 45° linear, left circular, −45° linear, right circular, 45° linear, right circular, −45° linear, left circular, etc. It is noted that the SOP of the optical information signal 102 could be circular, if desired, or elliptical with a principal axis at ±45°. Then, the modulation of the SOP of output optical signal 103 will begin at a different point in the sequence, move all the way around a great circle on the Poincaré sphere, and then return along the great circle to the point of beginning.

If desired, balanced sinusoidal drive voltages could be employed to provide the modulation, namely, $$V(t) = V_m \sin(2\pi ft) \tag{3}$$

However, use of the sinusoidal drive voltages will cause the polarization states to be traced along a great circle on the Poincaré sphere with non-uniform speed. In the case of $V_m = V_\pi$, the modulated optical signal 103 traces a full great circle on the Poincaré sphere, but will spend unequal time intervals in the orthogonal polarization states. Nevertheless, different values of $V_m$, causing incomplete or overcomplete great circles to be traced on the Poincaré sphere under sinusoidal drive voltages, can also be used to equalize PDHB effects through appropriate non-uniform weighting of SOPs. The general requirement is that $V_m$ must be selected to cause the average degree of polarization to vanish over a single modulation cycle. In the case of $V_m = 0.7655 \cdot V_\pi$, for example, the modulated optical signal 103 will trace only 76% of a full great circle on the Poincaré sphere, but optical signal 103 will, on average, be completely depolarized.

FIG. 3 shows another embodiment of polarization modulator 101 which also may be employed in practicing the invention. Again, an integrated optic realization of polarization modulator 101 is fabricated on low-birefringence X-cut, Z-propagating LiNbO$_3$ substrate 201 and operates with a standard titanium-indiffused, single mode waveguide 202. It includes three electrodes, two of which, i.e., 203 and 204, are disposed on both sides of waveguide 202 and one common ground electrode 205 on the top of waveguide 202. This embodiment of modulator 101 operates in a similar fashion to an endlessly rotating half-wave plate, i.e., it generates a constant phase retardation of $\pi$ at a variable orientation. This is achieved by inducing a variable combination of TE-TM phase shifting and TE$\rightleftarrows$TM mode conversion.

TE$\rightleftarrows$TM mode conversion is accomplished via the $r_{61}$ ($r_{61} = -r_{22}$) electro-optic coefficient by applying drive voltages V(t) and V'(t) to the side electrodes 203 and 204, thereby inducing an electric field $E_x$ in the waveguide 202. The phase retardation $\eta$ (t) for mode conversion induced in an electrode section of length L is $$\eta(t) = \Gamma\, r_{61} \frac{2\pi}{\lambda} \cdot \frac{V(t)}{G} \cdot L\, n_o^3 \tag{4}$$

where t is time, $\lambda$ is the free-space wavelength, G is the gap between the ground electrode 205 and the side electrodes 203 and 204, L is the length of electrodes 203, 204 and 205, $n_o$ is the ordinary index of refraction and $\Gamma$ is the spatial overlap of the applied electric field $E_x$ with the optic fields ($0 \leq \Gamma \leq 1$).

TE-TM phase shifting is induced in a similar way as in the embodiment of modulator 101 shown in FIG. 2 by applying opposite drive voltages V(t) = −V'(t) to side electrodes 203 and 204.

The drive voltage V(t) and V'(t) applied to electrodes 203 and 204, respectively, are $$V(t) = V_0 \sin(2\pi ft) + V_\pi \cos(2\pi ft) + V_T \text{ and} \tag{5}$$

$$V'(t) = V_0 \sin(2\pi ft) - V_\pi \cos(2\pi ft) - V_T, \quad (6)$$

where $V_0$ is the voltage that induces complete TE-TM mode conversion ($\eta = \pi$), $V_\pi$ is the voltage that induces a TE-TM phase shift of $\pi(\Delta\Phi = \pi)$, and $V_T$ is the voltage that reduces the residual, static birefringence in waveguide 202 substantially to zero (0).

When driven by these drive voltages V(t) and V'(t), polarization modulator 101 acts like a rotating half-wave plate spinning at a constant angular velocity of $\pi f$.

In the example shown in FIG. 3, polarization modulator 101 operates to modulate an incoming optical information signal 102 being launched at a linearly polarized state of arbitrary orientation relative to the X and Y axes. In response to the drive voltages noted above, the SOP of the optical signal 103 emerging from polarization modulator 101 traces the entire equatorial circle upon the Poincaré sphere continuously in the same direction at a constant angular velocity of $2\pi f$. The periodic sequence of polarization states of the output optical signal 103 emerging from the polarization modular is as shown in FIG. 3. Output optical signal 103 is always linearly polarized and passes through the following sequence: 45° linear, 0° linear, −45° linear, 90° linear, 45° linear and repeating itself. It is noted that the polarization state of the optical information signal 102 can be arbitrary linear. The polarization sequence of output optical signal 103 may then begin at a different state. Additionally, the polarization sequence of output optical signal 103 may also be caused to pass through the above noted sequence in the opposite direction. The tracing of the equatorial circle at a constant speed is realized here by employing sinusoidal drive voltages, which allow substantially higher modulation frequencies than the sawtooth voltages required in the embodiment of FIG. 2.

FIG. 4 shows another embodiment of polarization modulator 101, which is particularly suited for high speed modulation.

The integrated-optic realization is fabricated on (high-birefringence) Z-cut LiNbO$_3$ substrate 201 and operates with a standard titanium-indiffused, single-mode waveguide 202. It includes three electrodes, two ground electrodes 203 and 204 disposed on both sides of wave guide 202 and the drive electrode 205 on top of waveguide 202. In this example, drive electrode 205 is terminated via resistor 206 to electrode 204. This embodiment of modulator 101 operates in a similar fashion to the embodiment of FIG. 2, producing periodic TE-TM phase shifting. The modulator in FIG. 4, however, utilizes substantially higher $r_{33} - r_{13}$ ($r_{33} - r_{13} = 20.10^{-12}$ m/V) electrooptic coefficients than the modulator 101 of FIG. 2 and can, therefore, be driven with a substantially lower drive voltage amplitude $V_\pi$. This, in turn, allows substantially higher modulation frequencies than with the modulator 101 of FIG. 2.

The modulator frequency may be further increased by using traveling wave electrodes with a termination resistor 206, i.e., by designing the electrodes, in a well known fashion, to be part of the electrical transmission line providing the high-frequency electric modulation signal.

The embodiment shown in FIG. 4 is particularly suited for modulating the SOP of the output optical signal 103 at a frequency which is a selected multiple of the information signal clock. This, in turn, tends to reduce the effects of polarization dependent loss.

The above-described arrangements are, of course, merely illustrative of the application of the principles of the invention. Other arrangements may be devised by those skilled in the art without departing from the spirit or scope of the invention. It should further be understood by those skilled in the art that although a titanium-indiffused waveguide structure for a lithium niobate modulator is the preferred design, other waveguide formations are contemplated and other substrates may be employed including but not limited to semiconductor materials and lithium tantalate, for example. Although not specifically shown, it is to be understood that optical signal source 100 includes means for obtaining the desired polarization of the optical signal being supplied to polarization modulator 101. Additionally, the modulated optical signal 103 is typically launched from the modulator 101 to the optical transmission system 104 via an amplification stage or the like.

We claim:

1. Apparatus intended for use in reducing the effects of polarization dependent hole-burning in an optical transmission system employing optical fiber amplifiers, the apparatus comprising:

means for generating a polarized optical signal at a desired wavelength;

waveguide means having an electrooptically induced variable birefringence for modulating the state of polarization of said polarized optical signal periodically over a range of polarization states such that the average degree of polarization is substantially equal to zero over a modulation cycle so that the effects of polarization dependent hole-burning are reduced, and means for supplying said polarized optical signal to said means for modulating.

2. Apparatus intended for use in reducing the effects of polarization dependent hole-burning in an optical transmission system employing optical fiber amplifiers, the apparatus comprising:

means for generating a polarized optical signal;

means for modulating the state of polarization of said polarized optical signal periodically between first and second states of polarization in at least one pair of orthogonal states of polarization so that substantially equal time is spent in each of the first and second states of polarization, said means for modulating including waveguide means having an electrooptically induced birefringence at a desired wavelength of operation and means for varying the orientation of linear birefringence of the waveguide and for introducing a predetermined phase retardation between said first and second orthogonal states of polarization of the optical signal wherein the predetermined phase retardation is substantially equal to $\pi$ radians when at least one of the states of polarization is substantially parallel to at least one of the principle axes of the linear birefringence, means for launching said modulated optical signal as an output, and means for supplying said polarized optical signal to said means for modulating.

3. The apparatus as defined in claim 2 wherein said means for varying orientation includes means for continuously rotating the orientation of the linear birefringence of the waveguide at a constant speed.

4. Apparatus intended for use in reducing the effects of polarization dependent hole-burning in an optical transmission system employing optical fiber amplifiers, the apparatus comprising:

means for generating a polarized optical signal;

means for modulating the state of polarization of said polarized optical signal periodically between first and second states of polarization in at least one pair of orthogonal states of polarization so that substantially equal time is spent in each of the first and second states of polarization, said means for modulating includes waveguide means having an electrooptically induced birefringence at a desired wavelength of operation and means for controllably varying a phase retardation between said first and second orthogonal states of polarization of the optical signal wherein the induced birefringence of the waveguide is at a predetermined orientation, and means for supplying said polarized optical signal to said means for modulating.

5. The apparatus as defined in claim 4 wherein said first and second orthogonal states of polarization are linear.

6. The apparatus as defined in claim 4 wherein said optical signal transports an information signal having a predetermined clock frequency and wherein said means for varying the phase retardation includes means for varying the phase retardation at a frequency that is a predetermined multiple of the clock frequency of said information signal wherein polarization dependent loss is reduced.

7. The apparatus as defined in claim 4 wherein the phase retardation is controlled to vary between predetermined positive and negative values.

8. The apparatus as defined in claim 7 wherein said means for varying the phase retardation includes means for varying said phase retardation sinusoidally and wherein said predetermined positive and negative values are $0.7655 \pi$ and $-0.7655 \pi$, respectively.

9. The apparatus as defined in claim 7 wherein the predetermined positive and negative values are at least $\pi/2$ and $-\pi/2$, respectively.

10. The apparatus as defined in claim 7 wherein said means for varying the phase retardation includes means for varying said phase retardation linearly between said predetermined positive and negative values.

11. The apparatus as defined in claim 7 wherein the predetermined positive and negative values are $\pi$ and $-\pi$, respectively.

12. The apparatus as defined in claim 11 wherein said means for varying the phase retardation includes means for varying said phase retardation linearly between said positive and negative values.

13. A method intended for use in reducing the effects of polarization dependent hole-burning in an optical transmission system employing optical fiber amplifiers, the method comprising the steps of:

generating a polarized optical signal at a desired wavelength;

launching said polarized optical signal; and electrooptically inducing variable birefringence in a wave guide to modulate the state of polarization of said launched polarized optical signal periodically over a range of polarization states such that the average degree of polarization is substantially equal to zero over a modulation cycle so that the effects of polarization dependent hole-burning are reduced.

14. A method intended for use in reducing the effects of polarization dependent hole-burning in an optical transmission system employing optical fiber amplifiers, the method comprising the steps of:

generating a polarized optical signal;

launching said polarized optical signal;

modulating the state of polarization of said launched polarized optical signal periodically between first and second states of polarization in at least one pair of orthogonal states of polarization so that substantially equal time is spent in each of the first and second states of polarization, said step of modulating including the steps of electrooptically inducing birefringence at a desired wavelength of operation in a waveguide, varying the orientation of linear birefringence of the waveguide and introducing a predetermined phase retardation between said first and second orthogonal states of polarization of the optical signal wherein the predetermined phase retardation is substantially equal to $\pi$ radians when at least one of the states of polarization is substantially parallel to at least one of the principle axes of the linear birefringence; and launching said modulated optical signal as an output.

15. The method as defined in claim 14 wherein said step of varying orientation includes the step of continuously rotating the orientation of the linear birefringence of the waveguide at a constant speed.

16. A method intended for use in reducing the effects of polarization dependent hole-burning in an optical transmission system employing optical fiber amplifiers, the method comprising the steps of:

generating a polarized optical signal;

launching said polarized optical signal; and modulating the state of polarization of said launched polarized optical signal periodically between first and second states of polarization in at least one pair of orthogonal states of polarization so that substantially equal time is spent in each of the first and second states of polarization, modulating including the steps of electrooptially inducing birefringence at a desired wavelength of operation in the waveguide, controllably varying a phase retardation between said first and second orthogonal states of polarization of the optical signal wherein the induced birefringence of the waveguide is at a predetermined orientation.

17. The method as defined in claim 16 wherein said first and second orthogonal states of polarization are linear.

18. The method as defined in claim 16 wherein said optical signal transports an information signal having a predetermined clock frequency and wherein said step of varying the phase retardation includes a step of varying the phase retardation at a frequency that is a predetermined multiple of the clock frequency of said information signal wherein polarization dependent loss is reduced.

19. The method as defined in claim 16 wherein the phase retardation is controlled to vary between predetermined positive and negative values.

20. The method as defined in claim 19 wherein said step of varying the phase retardation includes a step of varying said phase retardation sinusoidally and wherein said predetermined positive and negative values are $0.7655 \pi$ and $-0.7655 \pi$, respectively.

21. The method as defined in claim 19 wherein the predetermined positive and negative values are at least $\pi/2$ and $-\pi/2$, respectively.

22. The method as defined in claim 19 wherein said step of varying the phase retardation includes a step of varying said phase retardation linearly between said predetermined positive and negative values.

23. The method as defined in claim 19 wherein the predetermined positive and negative values are $\pi$ and $-\pi$, respectively.

24. The method as defined in claim 23 wherein said step of varying the phase retardation includes a step of varying said phase retardation linearly between said positive and negative values.

* * * * *